(12) United States Patent (10) Patent No.: US 6,519,599 B1
Chickering et al. (45) Date of Patent: Feb. 11, 2003

(54) VISUALIZATION OF HIGH-DIMENSIONAL DATA

(75) Inventors: D. Maxwell Chickering, Redmond, WA (US); David E. Heckerman, Bellevue, WA (US); Christopher A. Meek, Kirkland, WA (US); Robert L. Rounthwaite, Fall City, WA (US); Amir Netz, Bellevue, WA (US); Thierry D'Hers, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/517,138

(22) Filed: Mar. 2, 2000

(51) Int. Cl.[7] .................................................. G06F 17/30
(52) U.S. Cl. ...................................... 707/10; 707/104.1
(58) Field of Search ............................ 707/10, 103, 102, 707/104, 201; 706/47, 60

(56) References Cited

U.S. PATENT DOCUMENTS 5,999,923 A * 12/1999 Kowalski et al. ............. 706/47
6,138,123 A * 10/2000 Rathbun ....................... 707/201
6,216,134 B1 * 4/2001 Heckerman et al. .......... 707/104
6,301,579 B1 * 10/2001 Becker ......................... 707/102

* cited by examiner

Primary Examiner—Diane D. Mizrahi
(74) Attorney, Agent, or Firm—Amin & Turocy LLP

(57) ABSTRACT

Visualization of high-dimensional data sets is disclosed, particularly the display of a network model for a data set. The network, such as a dependency or a Bayesian network, has a number of nodes having dependencies thereamong. The network can be displayed items and connections, corresponding to nodes and dependencies, respectively. Selection of a particular item in one embodiment results in the display of the local distribution associated with the node for the item. In one embodiment, only a predetermined number of the items are shown, such as only the items representing the most popular nodes. Furthermore, in one embodiment, in response to receiving a user input, a sub-set of the connections is displayed, proportional to the user input. In another embodiment, a particular item is displayed in an emphasized manner, and the particular connections representing dependencies including the node represented by the particular item, as well as the items representing nodes also in these dependencies, are also displayed in the emphasized manner. Furthermore, in one embodiment, only an indicated sub-set of the items is displayed.

51 Claims, 6 Drawing Sheets

VISUALIZATION OF HIGH-DIMENSIONAL DATA

FIELD OF THE INVENTION

This invention relates generally to high-dimensional data, and more particularly to the visualization of such data.

BACKGROUND OF THE INVENTION

With the advent of the Internet, and especially electronic commerce ("ecommerce") over the Internet, the use of data analysis tools, has increased. In ecommerce and other Internet and non-Internet applications, databases are generated and maintained that have large amounts of information, so that they can be analyzed, or "mined," to learn additional information regarding customers, users, products, etc. That is, data analysis tools provide for leveraging the data already contained in databases to learn new insights regarding the data by uncovering patterns, relationships, or correlations.

It is usually desirable for a data analyst to visualize the relationships and patterns underlying the data. Existing exploratory data analysis techniques include plotting data for subsets of variables, and various clustering methods. However, inasmuch as the data analyst desires to have as many tools at his or her disposal as possible, new visualization techniques for displaying the relationships and patterns underlying data are always welcome. For this and other reasons, therefore, there is a motivation for the present invention.

SUMMARY OF THE INVENTION

The invention relates to the visualization of high-dimensional data sets. In one embodiment, a network is constructed for a data set having a number of variables, which can also be referred to as dimensions or columns. The network, such as a dependency or a Bayesian network, has a number of nodes that have dependencies thereamong. Each node corresponds to a variable in the data set, and has a local distribution. Each dependency has a first node and a second node, such that the first node depends on the second node.

In one embodiment, the network is displayed as a number of items and a number of connections. Each item represents a node of the network. Each connection, such as an arc, represents a dependency and connects a first item representing the first node of the dependency with a second item representing the second node of the dependency. In one embodiment, selection of a particular item displayed that represents a particular node results in the display of the local distribution associated with the particular node.

In another embodiment, only a predetermined number of the items are shown, such as only the items representing the most popular nodes of the data set. Furthermore, in one embodiment, in response to receiving a user input, such as in conjunction with a graphical slider, a sub-set of the connections is displayed, proportional to the user input, in accordance with a predetermined measure of the dependencies represented by the connections. Thus, from all of the connections to only a connection representing the dependency having a largest value for the predetermined measure can be displayed.

In another embodiment, a particular item is displayed in an emphasized manner, and the particular connections representing dependencies including the node represented by the particular item, as well as the items representing nodes also in these dependencies, are also displayed in the emphasized manner. The emphasized manner can be, for example, only displaying the particular item, the particular connections, and the items representing nodes also in the dependencies represented by the particular connections, and not showing any of the other items or connections. Furthermore, in one embodiment, only an indicated sub-set of the items is displayed, as well as the connections representing dependencies among the nodes represented by the indicated sub-set of items. For example, the user may be able to add items to the indicated sub-set by searching for desired items, or otherwise selecting items, in an item-by-item manner.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
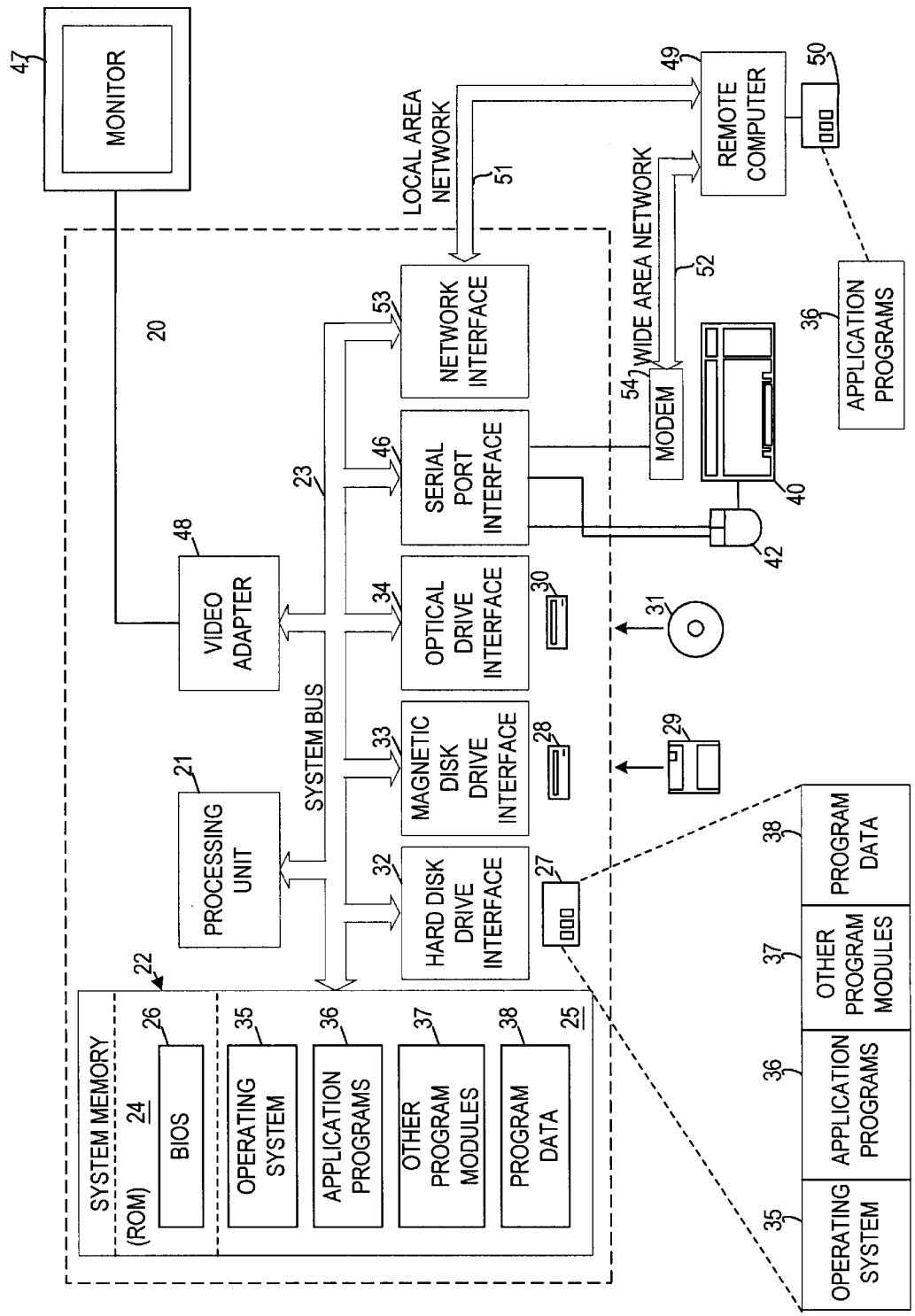
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

(Transactional or Sparse) Binary Data

In this section of the detailed description, transactional (sparse) binary data is described, in conjunction with which embodiments of the invention may be practiced. It is noted and emphasized, however, that the invention is not limited to application to transactional binary data, and that the description herein is made for example purposes only. For example, in other embodiments of the invention, non-transaction and/or dense data, such as demographic data, can be used.

Figure 2:
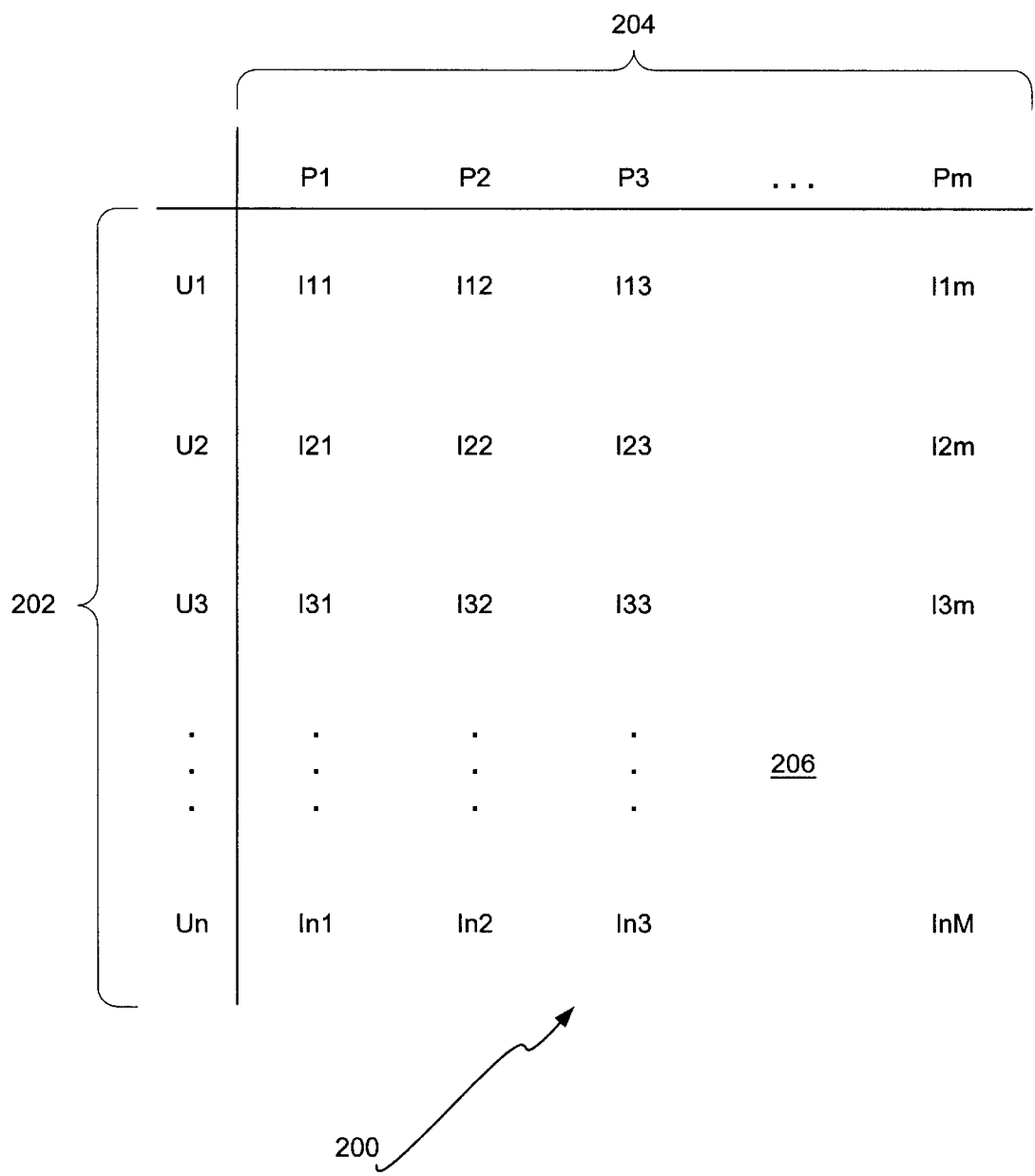
FIG. 2 is a diagram showing a representative set of binary transactional data in conjunction with which embodiments of the invention can be practiced.

Referring to FIG. 2, a diagram of transactional binary data in conjunction with which embodiments of the invention may be practiced is shown. The data 206 is organized in a chart 200, with rows 202 and columns 204. Each row, also referred to as a record, in the example of diagram of FIG. 2 corresponds to a user, such as users 1 ... n. In general, the term user, entity, row, case, or record is used to represent a collection of transactions pertaining to a single entity. These could be products bought by a shopper, in which case the record consists of the collection of all products purchased by a particular shopper.

Each column is referred to as a variable or a dimension. In the example of FIG. 2, each column corresponds to a product, such as products 1 ... m. Each entry within the data 206, also referred to as each item within the data 206, corresponds to whether the user has purchased the particular product, and is a binary value, where 1 corresponds to the user having purchased the particular product, and 0 corresponds to the user not having purchased the particular product. Thus, I23 corresponds to whether user 2 has purchased product 3, In2 corresponds to whether user n has purchased item 2, 1m corresponds to whether user 1 has purchased item m, and Inm corresponds to whether user n has purchased item m.

The data 206 is referred to as sparse, because most items have the value 0, indicating the fact that for any particular user, the user has likely not purchased a given product in the example. The data 206 is binary in that each item can have either the value 0 or the value 1. The data 206 is transactional in that the data was acquired by logging transactions of users' purchasing activity over a given period of time. It is noted that the particular correspondence of the rows 202 to users, and of the columns 204 to products, is for representative example purposes only, and does not represent a limitation on the invention itself. For example, the columns 204 in other embodiment could represent web pages that the users have viewed. In general, the rows 202 and the columns 204 can refer to any type of features. The columns 204 are interchangeably referred to herein as dimensions. Furthermore, it is noted that in large databases, the values n for the number of rows 202 can be quite large, approaching hundreds of thousands to tens of millions or more. And m for the number of columns 204 can be quite large, approaching the tens and the hundreds of thousands, if not more.

It is noted that the invention is not limited to any particular representation or correspondence of the data set. For example, as has been described, one such data set can be the purchasing activity of consumers over a number of products. Another example is the television viewing habits of viewers over a number of television shows. Still another example is the web browsing habits of computer users over a number of Internet web sites, or particular pages within those web sites. The invention is not so particularly limited. Furthermore, as has been noted, it is emphasized that embodiments of the invention are not related to transactional and/or sparse data, but can also be applied to non-transactional and/or dense data, for example.

Construction of a Network for the Data Set

Embodiments of the invention provide for the visualization of data for which a network has been constructed. The invention is not limited, however, to the manner by which such a network is constructed. The network includes a number of nodes with a number of connections representing dependencies thereamong, where each node corresponds to a variable of the data (i.e., a column or dimension of the data), and has a local distribution associated therewith. Each dependency has a first node and a second node, such that the first node depends on the second node. The network can be, for example, a dependency network (a directed graph), also referred to as a cyclic belief network, or a Bayesian network (a directed acyclic graph), also referred to as a belief network, although the invention is not so limited. As another example, the local distributions associated with the nodes can be decision graphs, or decision trees, although the invention is not so limited. For example, other local distributions include probabilistic neural networks, generalized linear models, and probabilistic support vector machines. Furthermore, in one particular embodiment, the networks and local distributions are constructed as described in the copending and coassigned patent application entitled "Belief Networks with Decision Graphs," filed on Jul. 30, 1997, and assigned Ser. No. 08/902,759.

Visualization of a Network for the Data Set

Figure 3:
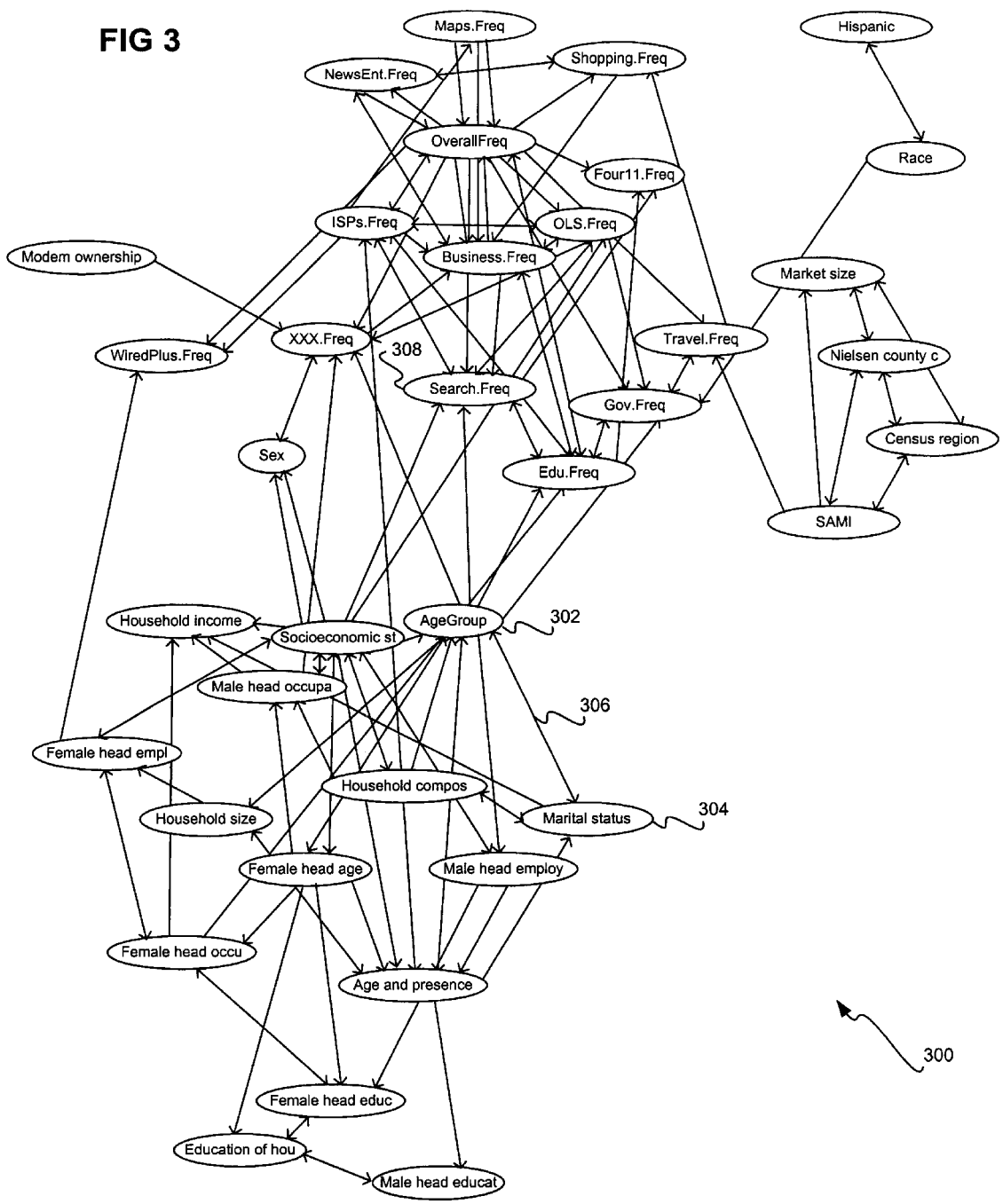
FIG. 3 is a diagram of a network of nodes connected by dependencies, according to one embodiment of the invention.

In this section of the detailed description, various techniques for the visualization of a network for a data set are described. In the diagram of FIG. 3, a network 300 is shown as a number of items corresponding to the variables of the network and as a number of connections corresponding to the dependencies of the network. Each item, such as the items 302 and 304, is shown as an oval, although the invention itself is not so limited. Each connection, such as the connection 306, is shown as a line connecting two nodes, having one or more arrow heads; in the case of the connection 306, the nodes 302 and 304 are connected. An arrow head pointing to a first node from a second node indicates that the first node depends on the second node. Thus, where there are arrow heads on each end of a connection, such as the connection 306, this means that both the first and the second nodes depend on each other. That is, the first node is predicted at least in part by the second node, and assists in predicting the second node. This is the case, for example, with nodes represented by the items 302 and 304 connected by the connection 306. A connection can also be referred to as an arc. The invention is not limited to items that are ovals, and connections that are lines, however.

Selection of an item, such as the item 308, causes the display of the local distribution associated with the node that is represented by the item. A local distribution for node Y is the probability distribution p(Y|Parents(Y)). One such type of local distribution is a decision tree, although the invention is not limited to this type of local distribution. A decision tree T is a structure used to encode a conditional probability distribution of a target variable Y, given a set of predictor variables $X=\{X_1, \ldots, X_n\}$, denoted p(Y|X). The structure is a tree, where each internal node I stores a mapping from the values of a predictor variable $X_j$ to the children of I in the tree. Each leaf node L in the tree stores a probability distribution for the target variable Y. The probability of the target variable Y, given a set of values $\{X_1=x_1, \ldots, X_n=x_n\}$ for the predictor variables, is obtained by starting at the root of T and using the internal-node mappings to traverse down the tree to a leaf node. The mappings in the internal nodes are referred to as splits. When an internal node I maps values of variable $X_j$ to its children, it is said that $X_j$ is the split variable of node I, and that I is a split on $X_j$.

Figure 4:
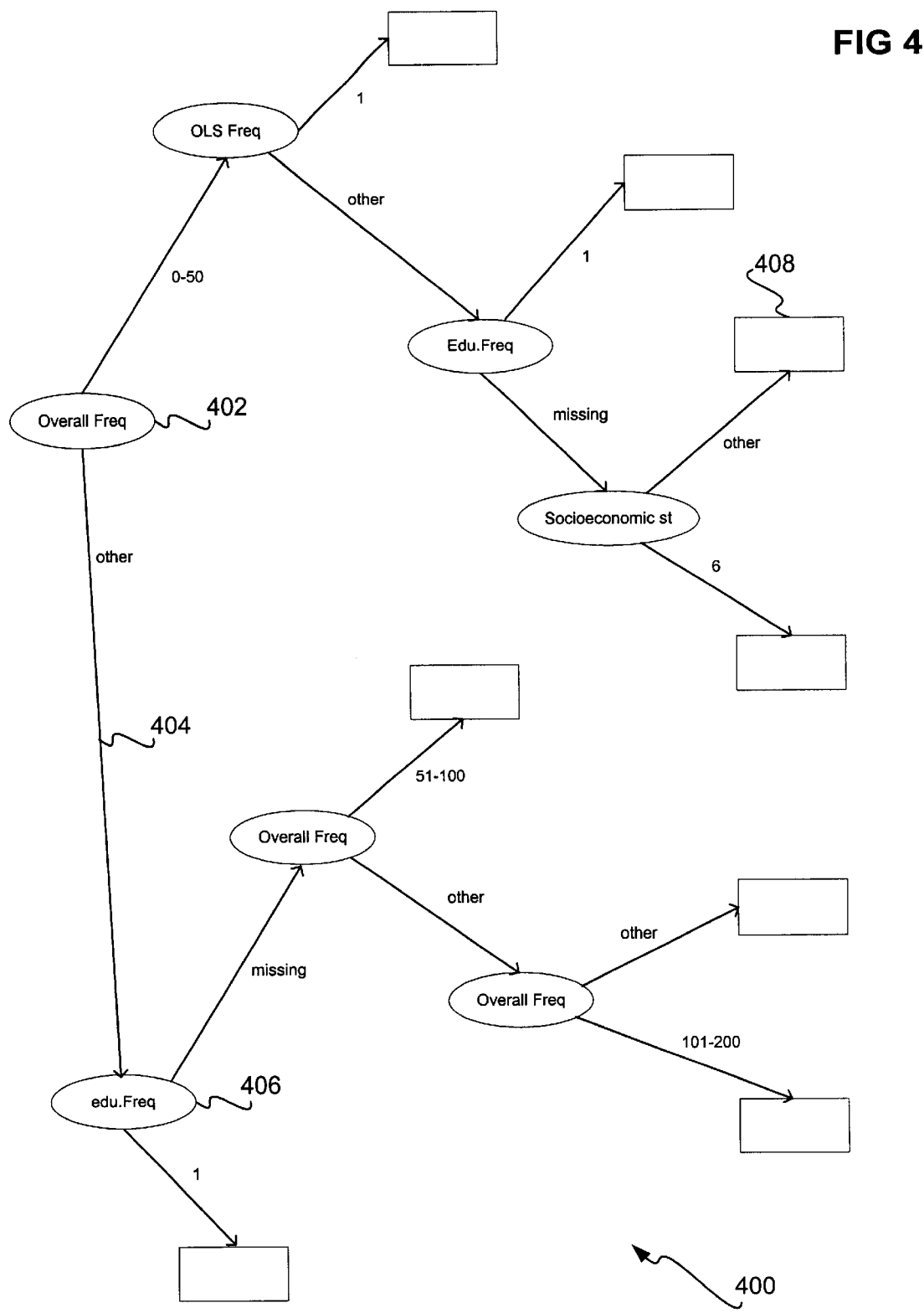
FIG. 4 is a diagram of a decision graph that is a local distribution for one of the nodes of the network of FIG. 3, according to one embodiment of the invention.

Referring to the diagram of FIG. 4, where the local distribution 400 for the node represented by the item 308 of FIG. 3 is shown. The local distribution 400 in the particular case of FIG. 4 is a decision tree, but the invention itself is not so limited. The local distribution 400 is displayed as a number of tree items and as a number of tree connections. Each tree item, such as the graph items 402 and 406, represents a tree node of the local distribution, such as a tree node of a decision graph, for example. Each tree connection, such as the tree connection 404, represents a value or a subset of values of the node to its immediate left, as is also shown specifically in FIG. 4. For example, a tree connection having a value of 1 indicates that if the node to its immediate left has a value of 1, then this connection is followed. As another example, a tree connection may have a range of values, such as 0–50, such that if the node to its immediate left has a value between 0 and 50, then this connection is followed. As further examples, a tree connection having a value of "other" indicates any other value besides the value(s) for the other tree connection spawning from the same node, while a tree connection having a value of "missing" indicates a situation where the node does not have a value.

The leaf nodes in the tree—that is, items that do not have connections emanating from them ending in arrow heads pointing to other items—are represented in FIG. 4 as box items, such as the box item 408. Each box item specifically represents a component of the local distribution 400. In particular, the box item represents the probabilities p(Y|Parents(Y)) for those values of Parents(Y) consistent with the labelings on the graph connections from the leftmost node to the box. Furthermore, it is noted that there is a relationship between the items in the local distribution 400 of FIG. 4 and the connections in the network 300 of FIG. 3. Specifically, when there is a particular tree item representing a first particular node in the local distribution 400 of FIG. 4 for a particular item representing a second particular node in the network 300 of FIG. 3, there is a corresponding connection in FIG. 3 representing a dependency between the first particular node and the second particular node. This is because the presence of a tree item representing a node in the local distribution 400 of FIG. 4 means that the node assists in the prediction of the node having the particular local distribution 400 of FIG. 4 —and this means likewise that there is a connection representing a dependency in the network 300 of FIG. 3 between these two nodes.

As can be appreciated by those of ordinary skill within the art, transactional data sets typically exhibit a phenomenon known as Zipf's law, in which if transactional variables are ranked by the number of records for which their value is greater than zero in decreasing order (that is, by their popularity), it is found that the number is a decreasing power-law function of popularity. Thus, a particular embodiment takes advantage of this phenomenon, by only displaying a predetermined number of transactional variables and their dependencies, which nevertheless show the vast majority of non-zero values in the data. Thus, in one embodiment, the network is displayed such that only a predetermined number of the items, representing the most popular nodes of the data set, and a sub-set of the connections representing dependencies having nodes represented by the predetermined number of items, are shown. The most popular nodes in one embodiment are in accordance with and are consistent with Zipf's law. It is noted that the use of Zipf's law as a measure to determined which nodes to display as the predetermined number of such nodes is only one such measure, and the invention is not so limited. That is, embodiments of the invention are amenable to any measure that can be used to determined a predetermined number of nodes to display—a measure of popularity in accordance with Zipf's law is only one such example.

Figure 5:
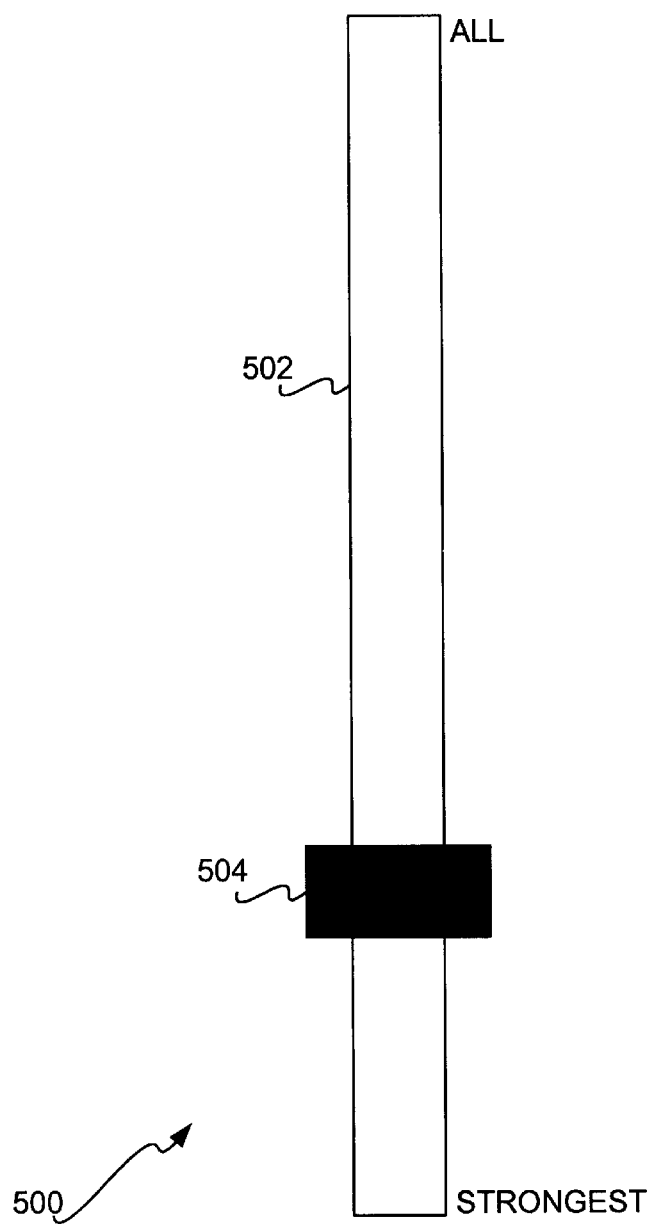
FIG. 5 is a diagram of a graphical slider control, according to one embodiment of the invention; and, FIG. 6 is a flowchart of a method according to an embodiment of the invention.

Embodiments of the invention also allow for user determination of the extent to which the connections of the network are shown, in accordance with an ordering of the connections. That is, based on a user input, only a sub-set of the connections representing the dependencies of the network is shown, proportional to the user input, such that, for example, anywhere from all of the connections to a single connection (e.g. the connection representing the strongest dependency) is shown. In one embodiment, the user input is received on a graphical slider control, such as the graphical slider control 500 in the diagram of FIG. 5. The control 500 has a span 502 ranging from all of the connections, which is a maximum position owing to the fact that a maximum number of connections are displayed, to only the connection representing the first dependency in the ordering, which is a minimum position owing to the fact that a minimum number of connections (namely, one) is displayed. The user moves the bar 504 between the two ends of the span 502, such that the connections are displayed proportionally to where the bar 504 is located on the span 502—if the bar 504 is closer to the "all" end of the span 502, then more of the connections will be shown, while if the bar 504 is closer to the "strongest" end of the span 502, then less of the connections will be shown. It is noted that while as has been described in this paragraph, the proportion of the connections shown is based on the order of the dependencies represented by the connections, that this is only one example of a predetermined measure of dependencies that can be so used, and the invention is itself not so limited.

The invention is not limited to the manner by which the connections are ordered; in generally, there are many methods for ordering the connections in a network. One such method, which is used in one particular embodiment, is to use the order in which the edges would have been inserted to the dependency network during model construction, assuming the construction algorithm used a greedy tree-growing approach. (An edge is inserted from item A to item B in the dependency network when the first split on A in the decision tree for B is applied by the algorithm.) An advantage of this approach is that connections corresponding to the strongest dependences tend to come early in the ordering if the scoring criterion for the construction algorithm measures strength of dependency. The invention, however, is not limited to the ordering method described, and those practiced in the art will appreciate that there are many methods to both measure and order dependency strength.

Embodiments of the invention further provide for a user to learn relationships among the data set, by allowing the user to select an item and in so doing highlight only the connections in the dependency or Bayes network associated with that item. Thus, in one embodiment, the user is able to select a particular item that represents a particular node, such that the particular item, particular connections representing dependencies having as one of their node the particular node, and items representing the other nodes within the dependencies represented by the particular connections, are displayed in an emphasized manner. In one embodiment, this emphasized manner means that only the particular item, the particular connections, and the items representing the other nodes within the dependencies represented by the particular connections are displayed—that is, no other items or connections are displayed.

In another embodiment, these items are divided into three different sub-sets and are coded in a different manner accordingly for the user: a first sub-set of items representing the nodes within the dependencies represented by the particular connections that only assist prediction of the particular node selected; a second sub-set of items representing the nodes within the dependencies represented by the particular connections that only are predicted (at least in part) by the particular node selected; a third sub-set of items representing the nodes within the dependencies represented by the particular connections that both assist prediction of the particular node selected, and that are predicted (at least in part) by the particular node selected; and a fourth subset of items than are not to be emphasized. In one embodiment, each of the sub-sets is coded in a different manner in that each sub-set of items is differently colored and/or dimmed. Thus, in one embodiment, the user is able to select a particular node, and immediately view the nodes that the particular node affects, the nodes that the particular node is affected by, and the nodes that the particular node both affects and is affected by.

In one embodiment, in particular where the sub-sets are coded in a different manner such as by color, a legend is displayed that indicates what each coding signifies. For example, if one color indicates the particular node, that color is so specified in the legend, and if another color indicates the nodes that the particular node is affected by, that color is also so specified in the legend, etc. The legend allows for users to more easily discern what each coding specifies—that is, in one embodiment, what each color specifies.

Embodiments of the invention also provide for a user to view only a desired, or indicated, sub-set of the items, such that only the connections representing dependencies among the nodes represented by the sub-set of items are shown in addition to these items. Furthermore, in one embodiment, the items representing any nodes within dependencies also including a node represented by an item within the sub-set of items are also shown. This can be implemented in one embodiment via a "find variable" feature, so that the user is able to specify one or more of the items of the indicated sub-set. For example, the user can specify that an item for a desired variable to shown, along with any of the items representing nodes that are in dependencies with the node of the specified item. Thus, a user could, for example, start with only one item, and then display other items as desired, representing desired nodes, and also specify at any time that any node included in a dependency with any of the specified nodes also be shown. That is, in one embodiment, the sub-set of items that is displayed is built on an item-by-item manner, by the user specifically specifying another node to be displayed, and optionally the nodes in dependencies with that node, as well.

Methods

In this section of the detailed description, methods according to varying embodiments of the invention are described. In some embodiments, the methods in particular are computer-implemented. The computer-implemented methods can be realized at least in part as one or more programs running on a computer—that is, as a program executed from a computer-readable medium such as a memory by a processor of a computer, such as the computer shown in and described in conjunction with FIG. 1. The programs are desirably storable on a machine-readable medium such as a floppy disk or a CD-ROM, for distribution and installation and execution on another computer.

Figure 6:
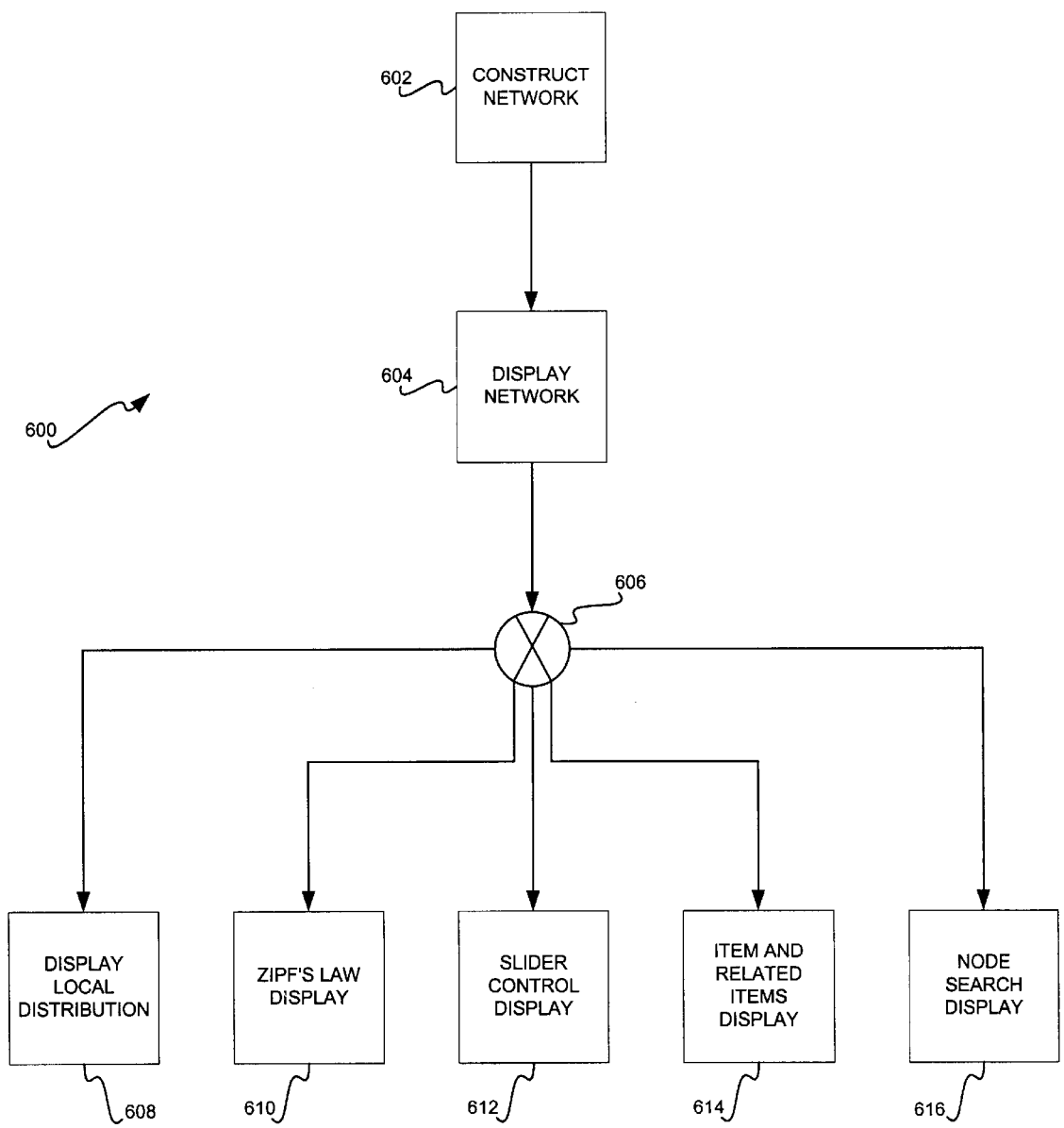

Referring to FIG. 6, a flowchart of a method 600 according to an embodiment of the invention is shown. In 602, a network is constructed for a data set, and in 604, the network is display, both as has been described in previous sections of the detailed description. Then, as represented by the circle 606, the display of the network is further accomplished by proceeding to one or more of 608, 610, 612, 614 and 616, as are now summarized briefly, and which have been more specifically described in the previous section of the detailed description. In 608, a local distribution for a node can be displayed. In 610, the most popular nodes can be displayed, in accordance with Zipf's law. In 612, the number of connections that are displayed can be varied, such as with a slider control as has been described. In 614, a particular item can be selected, such that only that item, and related items and connections, are displayed, as has also been described. Finally, in 616, a sub-set of items can be displayed, as can be built item-by-item via a search function, as has been described.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computer-implemented method for visualizing a data set having a plurality of variables, the method comprising:

constructing a dependency network for the data set having a plurality of nodes with a plurality of dependencies thereamong, each node corresponding to a variable of the data set and having a local distribution associated therewith, and each dependency having a first node and a second node of the plurality of nodes, such that the first node depends on the second node;

displaying the network as a plurality of items and as a plurality of connections, each item representing a node of the network, and each connection representing a dependency of the network and connecting a first item of the plurality of items representing the first node of the dependency with a second item of the plurality of items representing the second node of the dependency; and, upon selection of a particular item displayed representing a particular node of the network, displaying the local distribution associated with the particular node.

2. The method of claim 1, wherein the local distribution for each node of the network comprises one of: a decision tree, a decision graph, a neural network, a generalized linear model, and a support vector machine.

3. The method of claim 1, wherein the local distribution for each node of the network comprises a decision tree having a plurality of graph nodes comprising a sub-set of the plurality of nodes of the network and a plurality of tree dependencies comprising a sub-set of the plurality of dependencies of the network, and wherein displaying the local distribution associated with the particular node selected comprises displaying the local distribution as a plurality of tree items and as a plurality of tree connections, each tree item representing a tree node of the local distribution, and each tree connection representing a dependency in the local distribution.

4. The method of claim 1, wherein displaying the network as the plurality of items and as the plurality of connections comprises displaying only a predetermined number of the plurality of items, and a sub-set of the plurality of connections representing dependencies having nodes represented by the predetermined number of the plurality of items.

5. The method of claim 4, wherein the predetermined number of the plurality of items represent most popular nodes of the data set.

6. The method of claim 5, wherein the most popular nodes of the data set is based on Zipf's law.

7. The method of claim 1, further comprising, upon receiving a user input, displaying a sub-set of the plurality of connections proportional to the user input in accordance with a predetermined ordering of the connections.

8. The method of claim 7, wherein displaying the sub-set of the plurality of connections proportional to the user input is such that from all of the plurality of connections to a connection having a largest value for the predetermined measure is displayed, wherein the connections are ordered by the predetermined measure.

9. The method of claim 7, wherein receiving the user input comprises receiving the user input on a graphical slider slidable between a maximum position and a minimum position.

10. The method of claim 1, wherein displaying the network as the plurality of items and as the plurality of connections comprises displaying in an emphasized manner a particular item representing a particular node, particular connections representing dependencies having as one of their nodes the particular node, and the items representing the nodes within the particular connections.

11. The method of claim 10, wherein displaying in the emphasized manner comprises only displaying the particular node, the particular connections, and the items representing the nodes within the particular connections.

12. The method of claim 10, wherein a first sub-set of the items representing the nodes within the particular connections that assist prediction of the particular node are coded in a first manner, a second sub-set of the items representing the nodes within the particular connections that are at least in part predicted by the particular node are coded in a second manner, a third sub-set of the items representing the nodes within the particular connections that both assist prediction of the particular node and are at least in part predicted by the particular node are coded in a third manner, and a fourth sub-set of items representing the non-emphasized items are coded in a fourth manner.

13. The method of claim 12, wherein each of the first, the second, the third and the fourth manners comprise a different color.

14. The method of claim 12, further comprising displaying a legend indicating a specification of each of the first, the second, the third, and the fourth manners.

15. The method of claim 10, further comprising providing for user selection of the particular node.

16. The method of claim 1, wherein displaying the network as the plurality of items and as the plurality of connections comprises displaying only an indicated sub-set of the plurality of items, and particular connections representing dependencies among the nodes represented by the indicated sub-set of the plurality of items.

17. The method of claim 16, wherein displaying the network as the plurality of items and as the plurality of connections further comprises displaying items representing nodes within dependencies also including any of the nodes represented by an item within the indicated sub-set.

18. The method of claim 16, further comprising providing for user specification of the indicated sub-set of the plurality of items.

19. The method of claim 18, wherein providing for user specification comprises providing for user specification of the indicated sub-set of the plurality of items in an item-by-item manner.

20. A machine-readable medium having instructions stored thereon for execution by a processor to perform a method for visualizing a data set having a plurality of variables comprising:
    constructing a dependency network for the data set having a plurality of nodes with a plurality of dependencies thereamong, each node corresponding to a variable of the data set and having a local distribution associated therewith, and each dependency having a first node and a second node of the plurality of nodes, such that the first node depends on the second node;
    displaying the network as a plurality of items and as a plurality of connections, each item representing a node of the network, and each connection representing a dependency of the network and connecting a first item of the plurality of items representing the first node of the dependency with a second item of the plurality of items representing the second node of the dependency; and,
    upon selection of a particular item displayed representing a particular node of the network, displaying the local distribution associated with the particular node.

21. The medium of claim 20, wherein the network comprises one of: a dependency network and a Bayesian network, and the local distribution for each node of the network comprises one of: a decision graph, a neural network, a generalized linear model, and a support vector machine.

22. The medium of claim 20, wherein displaying the network as the plurality of items and as the plurality of connections comprises displaying only a predetermined number of the plurality of items representing most popular nodes of the data set, and a sub-set of the plurality of connections representing dependencies having nodes represented by the predetermined number of the plurality of items.

23. The medium of claim 20, further comprising, upon receiving a user input, displaying a sub-set of the plurality of connections proportional to the user input in accordance with a predetermined measure of each of the dependencies represented by the plurality of connections, from all of the plurality of connections to a connection having a largest value for the predetermined measure.

24. The medium of claim 23, wherein receiving the user input comprises receiving the user input on a graphical slider slidable between a maximum position and a minimum position.

25. The medium of claim 20, wherein displaying the network as the plurality of items and as the plurality of connections comprises displaying in an emphasized manner a particular item representing a particular node, particular connections representing dependencies having as one of their nodes the particular node, and the items representing the nodes within the particular connections.

26. The medium of claim 25, wherein displaying in the emphasized manner comprises only displaying the particular node, the particular connections, and the items representing the nodes within the particular connections.

27. The medium of claim 25, the method further comprising providing for user selection of the particular node.

28. The medium of claim 20, wherein displaying the network as the plurality of items and as the plurality of connections comprises displaying only an indicated sub-set of the plurality of items, and particular connections representing dependencies among the nodes represented by the indicated sub-set of the plurality of items.

29. The medium of claim 28, wherein displaying the network as the plurality of items and as the plurality of connections further comprises displaying items representing nodes within dependencies also including any of the nodes represented by an item within the indicated sub-set.

30. The medium of claim 28, further comprising providing for user specification of the indicated sub-set of the plurality of items.

31. A computer-implemented method for displaying a network for a data set having a plurality nodes with a plurality of dependencies thereamong, each node corresponding to a variable of the data set and having a local distribution associated therewith, each dependency having a first node and a second node of the plurality of nodes, such that the first node depends on the second node, the method comprising:
  displaying the network as a plurality of items and as a plurality of connections, each item representing a node of the network, and each connection representing a dependency of the network and connecting a first item of the plurality of items representing the first node of the dependency with a second item of the plurality of items representing the second node of the dependency, in at least one of the following manners:
  upon selection of a particular item displayed representing a particular node of the network, displaying the local distribution associated with the particular node;
  displaying only a predetermined number of the plurality of items representing most popular nodes of the data set, and a sub-set of the plurality of connections representing dependencies having nodes represented by the predetermined number of the plurality of items;
  upon receiving a user input, displaying a sub-set of the plurality of connections proportional to the user input in accordance with a predetermined measure of each of the dependencies represented by the plurality of connections, from all of the plurality of connections to a connection having a largest value for the predetermined measure;
  displaying in an emphasized manner a particular item representing a particular node, particular connections representing dependencies having as one of their nodes the particular node, and the items representing the nodes within the particular connections; and,
  displaying only an indicated sub-set of the plurality of items, and particular connections representing dependencies among the nodes represented by the indicated sub-set of the plurality of items.

32. The method of claim 31, wherein the network comprises one of: a dependency network and a Bayesian network, and the local distribution for each node of the network comprises one of: a decision graph, a neural network, a generalized linear model, and a support vector machine.

33. The method of claim 31, wherein the predetermined number of the plurality of items represent most popular nodes of the data set.

34. The method of claim 31, wherein displaying the sub-set of the plurality of connections proportional to the user input is such that from all of the plurality of connections to a connection having a largest value for the predetermined measure is displayed, wherein the connections have edges such that the connections are ordered by their edges.

35. The method of claim 34, wherein receiving the user input comprises receiving the user input on a graphical slider slidable between a maximum position and a minimum position.

36. The method of claim 31, wherein displaying in the emphasized manner comprises only displaying the particular node, the particular connections, and the items representing the nodes within the particular connections.

37. The method of claim 31, further comprising providing for user selection of the particular node.

38. A computer-implemented method for visualizing a data set having a plurality of variables, the method comprising:
  constructing a Bayesian network for the data set having a plurality of nodes with a plurality of dependencies thereamong, each node corresponding to a variable of the data set and having a local distribution associated therewith, and each dependency having a first node and a second node of the plurality of nodes, such that the first node depends on the second node;
  displaying the network as a plurality of items and as a plurality of connections, each item representing a node of the network, and each connection representing a dependency of the network and connecting a first item of the plurality of items representing the first node of the dependency with a second item of the plurality of items representing the second node of the dependency,
  wherein only a predetermined number of the plurality of items, and a sub-set of the plurality of connections representing dependencies having nodes represented by the predetermined number of the plurality of items, are displayed.

39. The method of claim 38, further comprising, upon selection of a particular item displayed representing a particular node of the network, displaying the local distribution associated with the particular node.

40. The method of claim 38, wherein the predetermined number of the plurality of items represent most popular nodes of the data set.

41. A computer-implemented method for visualizing a data set having a plurality of variables, the method comprising:
  constructing a Bayesian network for the data set having a plurality of nodes with a plurality of dependencies thereamong, each node corresponding to a variable of the data set and having a local distribution associated therewith, and each dependency having a first node and a second node of the plurality of nodes, such that the first node depends on the second node;
  displaying the network as a plurality of items and as a plurality of connections, each item representing a node of the network, and each connection representing a dependency of the network and connecting a first item of the plurality of items representing the first node of the dependency with a second item of the plurality of items representing the second node of the dependency; and,
  upon receiving a user input, displaying a sub-set of the plurality of connections proportional to the user input in accordance with a predetermined ordering of the connections.

42. The method of claim 41, wherein displaying the sub-set of the plurality of connections proportional to the user input is such that from all of the plurality of connections to a connection having a largest value for the predetermined measure is displayed, wherein the connections are ordered by the predetermined measure.

43. The method of claim 41, wherein receiving the user input comprises receiving the user input on a graphical slider slidable between a maximum position and a minimum position.

44. A computer-implemented method for visualizing a data set having a plurality of variables, the method comprising:

constructing a Bayesian network for the data set having a plurality of nodes with a plurality of dependencies thereamong, each node corresponding to a variable of the data set and having a local distribution associated therewith, and each dependency having a first node and a second node of the plurality of nodes, such that the first node depends on the second node;

displaying the network as a plurality of items and as a plurality of connections, each item representing a node of the network, and each connection representing a dependency of the network and connecting a first item of the plurality of items representing the first node of the dependency with a second item of the plurality of items representing the second node of the dependency, wherein particular item representing a particular node, particular connections representing dependencies having as one of their nodes the particular node, and the items representing the nodes within the particular connections, are displayed in an emphasized manner.

45. The method of claim 44, wherein the emphasized manner comprises only displaying the particular node, the particular connections, and the items representing the nodes within the particular connections.

46. The method of claim 44, wherein a first sub-set of the items representing the nodes within the particular connections that assist prediction of the particular node are coded in a first manner, a second sub-set of the items representing the nodes within the particular connections that are at least in part predicted by the particular node are coded in a second manner, a third sub-set of the items representing the nodes within the particular connections that both assist prediction of the particular node and are at least in part predicted by the particular node are coded in a third manner, and a fourth sub-set of items representing the non-emphasized items are coded in a fourth manner.

47. The method of claim 46, further comprising displaying a legend indicating a specification of each of the first, the second, the third, and the fourth manners.

48. The method of claim 44, further comprising providing for user selection of the particular node.

49. A computer-implemented method for visualizing a data set having a plurality of variables, the method comprising:

constructing a Bayesian network for the data set having a plurality of nodes with a plurality of dependencies thereamong, each node corresponding to a variable of the data set and having a local distribution associated therewith, and each dependency having a first node and a second node of the plurality of nodes, such that the first node depends on the second node;

displaying the network as a plurality of items and as a plurality of connections, each item representing a node of the network, and each connection representing a dependency of the network and connecting a first item of the plurality of items representing the first node of the dependency with a second item of the plurality of items representing the second node of the dependency, wherein only an indicated sub-set of the plurality of items, and particular connections representing dependencies among the nodes represented by the indicated sub-set of the plurality of items, are displayed.

50. The method of claim 49, further comprising displaying items representing nodes within dependencies also including any of the nodes represented by an item within the indicated sub-set.

51. The method of claim 49, further comprising providing for user specification of the indicated sub-set of the plurality of items.

* * * * *